United States Patent [19]

Tom

[11] Patent Number: 5,812,950
[45] Date of Patent: Sep. 22, 1998

[54] CELLULAR TELEPHONE SYSTEM HAVING PRIORITIZED GREETINGS FOR PREDEFINED SERVICES TO A SUBSCRIBER

[75] Inventor: Wayne S. Tom, St. Laurent, Canada

[73] Assignee: Telefonaktiebolaget LM Ericsson (publ), Stockholm, Sweden

[21] Appl. No.: 562,913

[22] Filed: Nov. 27, 1995

[51] Int. Cl.$^6$ ................................... H04Q 7/22
[52] U.S. Cl. ................ 455/440; 379/127; 379/112; 379/88; 379/199
[58] Field of Search ............... 379/59, 58, 127, 379/112; 348/6; 455/440, 405, 433, 456, 558; 340/825.03

[56] References Cited

U.S. PATENT DOCUMENTS

| | | | |
|---|---|---|---|
| 5,210,789 | 5/1993 | Jeffus et al. | 379/127 |
| 5,396,541 | 3/1995 | Farwell et al. | 455/56.1 |
| 5,579,379 | 11/1996 | D'Amico et al. | 379/112 |
| 5,586,338 | 12/1996 | Lynch et al. | 455/54.1 |
| 5,610,973 | 3/1997 | Comer | 455/54.1 |
| 5,613,205 | 3/1997 | Dufour | 455/56.1 |
| 5,623,539 | 4/1997 | Bassenyemukasa et al. | 379/88 |
| 5,625,680 | 4/1997 | Foladare et al. | 379/199 |

FOREIGN PATENT DOCUMENTS

WO 94/21075   9/1994   WIPO .

OTHER PUBLICATIONS

TDMA Forum, "Non–Public Mode Operation and Selection", Mar. 9, 1995, Version 2.0, pp. 2–31.

*Primary Examiner*—William Cumming
*Attorney, Agent, or Firm*—Steven W. Smith

[57] ABSTRACT

A system and method for providing prioritized greetings to subscribers having cellular telephone services based on subscriber location. The system identifies a plurality of service zones in the system, and also transmits predefined services to subscribers when located in the service zones. The system transmits service zone identification information from each service zone to each of the subscribers located in the service zone. The system also transmits to each of the subscribers zone profile information having an associated priority for which the subscriber receives differing predefined services. The system compares subscriber zone profile information with the service zone information transmitted and provides a greeting to the subscriber identifying the predefined service available to the subscriber located in that zone whereby any overlap in zones for which a subscriber receives differing predefined services will result in the greeting relating to higher prioritized zone profile information.

27 Claims, 4 Drawing Sheets

CELLULAR TELEPHONE SYSTEM HAVING PRIORITIZED GREETINGS FOR PREDEFINED SERVICES TO A SUBSCRIBER

BACKGROUND OF THE INVENTION

1. Technical Field of the Invention

The present invention relates to cellular telephone systems and, in particular, to a method and apparatus for providing prioritized greetings to subscribers having cellular telephone services based on subscriber location.

2. Description of Related Art

Conventional wire-line telephone service providers price monthly charges based on subscriber services and telephone calls by taking into account a number of pricing structure parameters including call duration, call distance, time of day and day of the week. The generally fixed nature of the physical plant used to provide telephone service, coupled with the fact that calls are made from one known fixed geographic location to another, allows for the user to have a general understanding of the charges associated with and the variety of telephone services available at that location. Consequently, there is no real necessity to inform the caller of services available to the subscriber at that location since the location is fixed.

The nature of the cellular telephone network, however, wherein system users have little or no geographical restrictions on the locations from which they may place or receive calls, makes the determination of what services are available to the subscriber in different locations a more important feature. Services offered vary based not only on some or all of the wire-line parameters mentioned above, but also on factors such as which of several available cellular service providers carry the call and whether the subscriber is roaming outside its own service area. Because the subscriber is generally unaware of how the foregoing factors affect the instantaneous services available for each call, it is unlikely that the subscriber can make anything more than a guess as to the services available for the call.

As discussed in TDMA FORUM, "Implementation Guide: Non-Public Mode Operation and Selection in IS-136 Compliant Mobile Stations", dated Mar. 9, 1995 and herein incorporated by reference, there are currently steps being taken in the cellular industry to provide alphanumeric tags or greetings to a subscriber in a cellular telephone system. The greeting is an optional feature that allows a subscriber to receive an alphanumeric message identifying a service provided such as, for example, service zone identification and charging information. The greeting service is independent of tone notification.

There is a new provision provided for location based services wherein the user profile may include several service profiles for the user where each service profile is defined for a zone location where the user is located. While location based services forms no part of the present invention, there is a potential problem with a system greeting associated with such services in instances where one or more cells are defined in overlapping service zones for one user, such as, for example, overlapping service zones for a residential location and place of business location. Consequently, the cellular telephone communication system is not able to determine which of the predefined services is to be used and which system name greeting is to be displayed.

SUMMARY OF THE INVENTION

The present invention is directed to a cellular telecommunications system that provides a greeting to the subscriber advising the subscriber of the type of predefined services which are applicable to the subscriber at its current location. More specifically, the present invention is directed to setting a priority associated with the greetings in the event the cell coverage area is defined to provide more than one predefined service for the subscriber.

In accordance with one aspect of the present invention there is provided a cellular communication system for providing prioritized greetings of predetermined services to its subscribers depending in which one of a plurality of service zones the subscriber is located. The system includes notifying means for notifying each of the subscribers of its subscriber zone profile information with an associated priority for which the subscriber receives differing predefined services. The system further includes comparing means for comparing subscriber zone profile information with the service zone to determine applicability of predefined services to the subscriber. Greeting means, responsive to the comparing means, form part of the system for providing a greeting to the subscriber identifying the predefined service available to the subscriber. The greeting means provides the greeting related to higher prioritized zone profile information when the comparing means determines more than one predefined services is applicable.

Preferably, the subscriber zone information is transmitted in sequential order of priority. The priority of the sequential order is preferably the highest priority associated with the first subscriber zone information transmitted to lowest priority associated with the last subscriber zone information transmitted. Alternatively, the priority of the sequential order is lowest priority associated with the first subscriber zone information transmitted to highest priority associated with the last subscriber zone information transmitted.

In accordance with another aspect of the present invention there is provided a cellular communication system for providing prioritized greetings of predefined services to its subscribers. The system includes means for identifying a plurality of service zones in the system. Further, the system includes means for transmitting predefined services to subscribers when located in the service zones and means for transmitting service zone identification information from each service zone to each of the subscribers located in the service zone. The system also includes means for transmitting to each of the subscribers its subscriber zone profile information having an associated priority for which the subscriber receives differing predefined services. The system includes means for comparing subscriber zone profile information with the service zone information transmitted and greeting means responsive to the comparing means for providing a greeting to the subscriber identifying the predefined service available to the subscriber. The greeting is transmitted when the zone profile information matches the service zone identification information. The greeting means provides the greeting related to higher prioritized subscriber zone profile information when the comparing means determines more than one predefined services is applicable.

Preferably, the means for transmitting service zone identification information from each service zone to each of the subscribers located in the service zone transmits the zone identification information on a cell by cell basis. This zone identification information is an identification that a particular cell belongs to one or more zones. The means for transmitting service zone identification information is a base station electronically connected to the MSC.

This subscriber zone identification information preferably is a list of either private system ID's (PSID) or residential system ID's (RSID). This subscriber zone information is transmitted upon registration of the subscriber and is stored in the subscriber's terminal. The PSID and RSID are preferably transmitted in sequential order of priority to the subscriber whereby the subscriber relies on the first PSID/RSID transmitted when more than one of these subscriber zone information corresponds to the zone identification information transmitted by the radio base station at a particular cell. The subscriber zone information is preferably stored in the home location register (HLR) and upon registration of the subscriber with the MSC the subscriber zone information is transmitted from the HLR through the MSC to the subscriber.

In accordance with another aspect of the present invention there is provided a method for prioritizing greetings of predefined services to its subscribers depending in which one of a plurality of service zones the subscriber is located in a cellular communications system, the method comprises the steps of:

notifying each of said subscribers of its subscriber zone profile information with an associated priority for which the subscriber receives differing predefined services;

comparing subscriber zone profile information with the service zone to determine applicability of predefined services to said subscriber; and, providing a greeting to said subscriber identifying the predefined service available to the subscriber where the greeting is related to higher prioritized zone profile information when the comparing step determines that more than one predefined services is applicable.

BRIEF DESCRIPTION OF THE DRAWINGS

A more complete understanding of the method and apparatus of the present invention may be obtained by reference to the following detailed description when taken in conjunction with the accompanying drawings wherein.

DETAILED DESCRIPTION OF EMBODIMENTS

Figure 1:
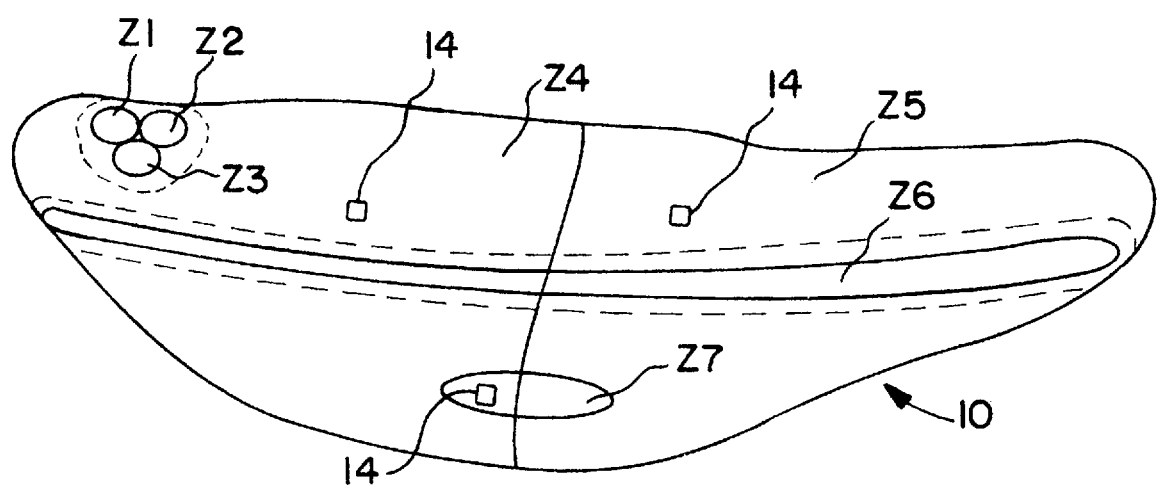
FIG. 1 illustrates the subdivision of a portion of a cellular coverage area to include a plurality of service zones in the cellular system of the present invention.

Referring now to FIG. 1, there is shown an arbitrary geographic area 10 wherein a service area for a cellular communication system is provided to a plurality of subscribers 14 by at least one service provider. The cellular service area 10 is subdivided to include a plurality of service zones Z1, Z2, Z3, Z4, Z5, Z6, and Z7 (or Z1 to Z7), wherein one service zone may, but need not necessarily, be adjacent to, overlapping or contiguous with another service zone. For simplicity only seven zones Z1 to Z7 are shown. Furthermore, some portions of the area 10, although included for purposes of providing cellular communications coverage, may not be included within any of the service zones Z1 to Z7. The cell and/or coverage area of each service zone Z1 to Z7 within the area 10 is preferably selected by the cellular service provider and is defined and identified in the mobile switching center (MSC) of the cellular system.

The service zones Z1 to Z7 facilitate the provision of a special predefined service that entitles subscribers 14 who participate in the service to have access to increased services provided the calls occur when the subscriber is located within an authorized one of the predefined service zones Z1 to Z7. These services are transmitted to the subscribers 14 by a radio base station (BS) and the MSC. It should be recognized that each subscriber may be authorized to receive the special service of one of the service zones Z1 to Z7 while simultaneously not be so authorized within another one of the service zones within the area 10. Calls occurring when the subscriber is located outside an authorized one of its service zones Z1 to Z7 may allow the subscriber to have access to conventional services. A greeting is provided to the subscriber to inform the subscriber of the predefined service available in any given zone. The subscriber may have access to more than one service zone Z1 to Z7. For example, a subscriber could have a multiple subscriber zone profiles as shown in FIG. 1 to include 3 zones (home zone Z2, transportation corridor zone Z6 and office zone Z7). In order to give one zone priority in the greeting over the other zone, priority information about the greeting is stored in the subscriber's terminal in any given zone.

The purpose of the system greetings to the subscriber terminals is to notify the subscriber 14 of the predefined service applicable to the subscriber in any given zone. The greeting is preferably stored in the form of text that is displayed on the subscriber's terminal. The greeting text is stored as part of the predefined services data in the home location register. It should be understood that a greeting may be defined for each of the geographical services zone Z1 to Z7. The greeting text in the mobile terminal is updated when the mobile goes for one service zone to another. This update occurs during zone changes in idle (non-speech) mode, hand-off events during speech mode, and at the start of each call if enabled by a digital base station command.

In accordance with the predefined services, each participating subscriber may select for himself or herself subscriber zone profiles comprised of one or more provider defined service zones Z1 to Z7. It will be understood that the service zones Z1 to Z7 selected for any given subscriber zone profile need not necessarily be contiguous, adjacent or overlapping. Furthermore, more than one subscriber may share the same subscriber zone profile. The predefined service entitles participating subscribers to make and receive cellular telephone calls with special cellular services provided the calls occur when the subscriber is located within one of the service zones Z1 to Z7 selected by the subscriber for inclusion within its subscriber zone profiles.

Figure 2:
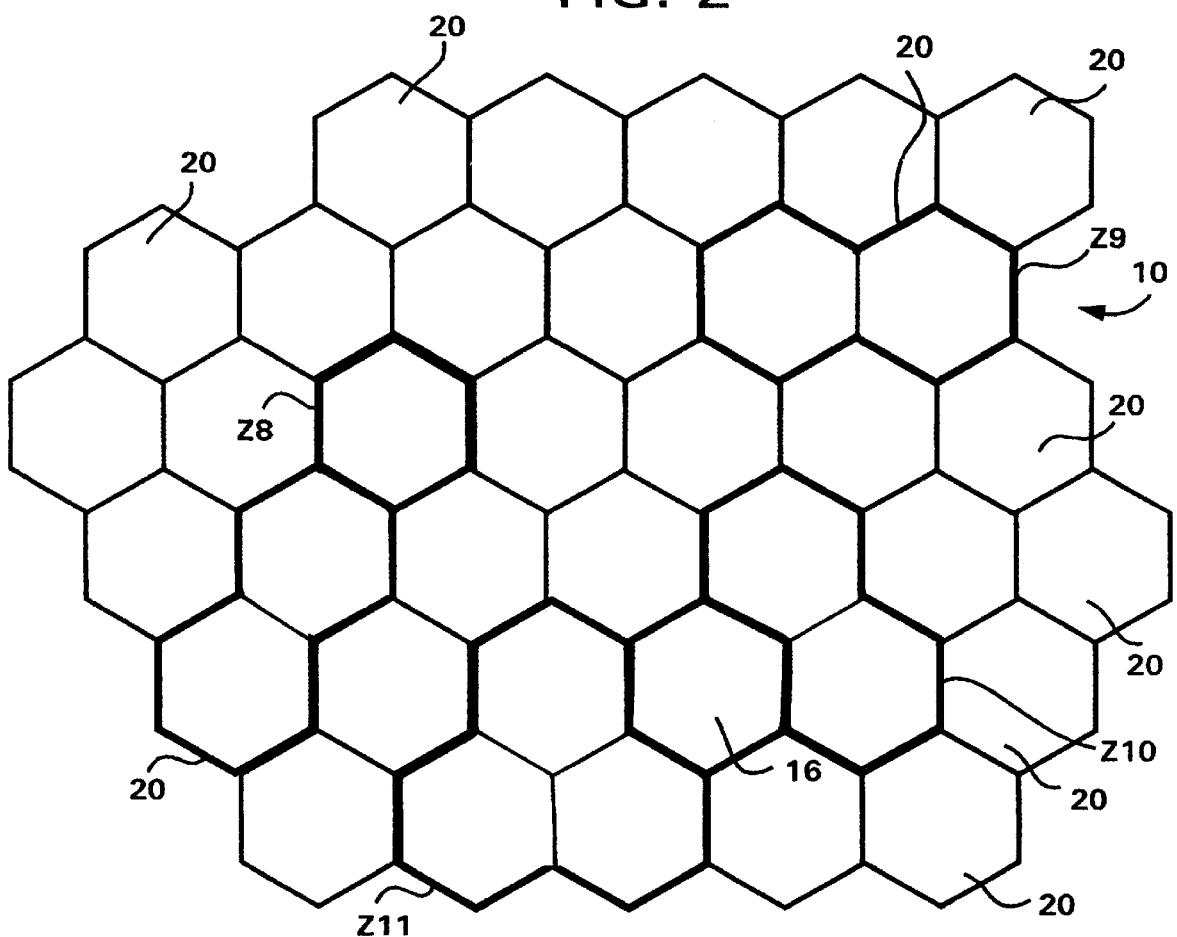
FIG. 2 illustrates the relationship between cells and service zones in the cellular system of the present invention.

Reference is now made to FIG. 2 wherein a small portion of the cellular coverage area 10 is shown to be comprised of a plurality of cells 20 (represented by hexagons). An exemplary plurality of service zones Z8 to Z11 (outlined in bold lines to ease recognition) are shown in the area 10. Zones Z8 to Z11 are defined by the service provider to set out geographical areas where predefined services are provided. Each service zone Z8 to Z11 includes one or more of the cells 20, and a cell in the area 10 may reside in one, more than one, or none of the service zones Z8 to Z11. A subscriber's zone profiles are assembled from the service zones Z8 to Z11. The service zones for any given subscriber zone profile need not necessarily be adjacent to each other and may overlap in that a cell such as cell 16. Cell 16 is defined in two or more zones Z10 and Z11. That is to say there may be a cell overlap making available two differing sets of predefined services to a subscriber. It is in this overlapping condition that the present invention addresses prioritizing the greeting.

The cells 20 spread throughout the cellular service area 10 may be serviced by different cellular service providers. However, the service zones Z8 to Z11 preferably include cells 20 serviced by one service providers. Thus, in general, it should be recognized that the predefined services provided are flexible in its implementation, and not restricted to provision by one service provider or by multiple uncooperative providers or within the coverage responsibility of a single mobile switching center. Agreements between providers concerning the extent of service zones Z8 to Z11 and the special services available to participating subscribers, will facilitate the efficient offering of the service.

Figure 3:
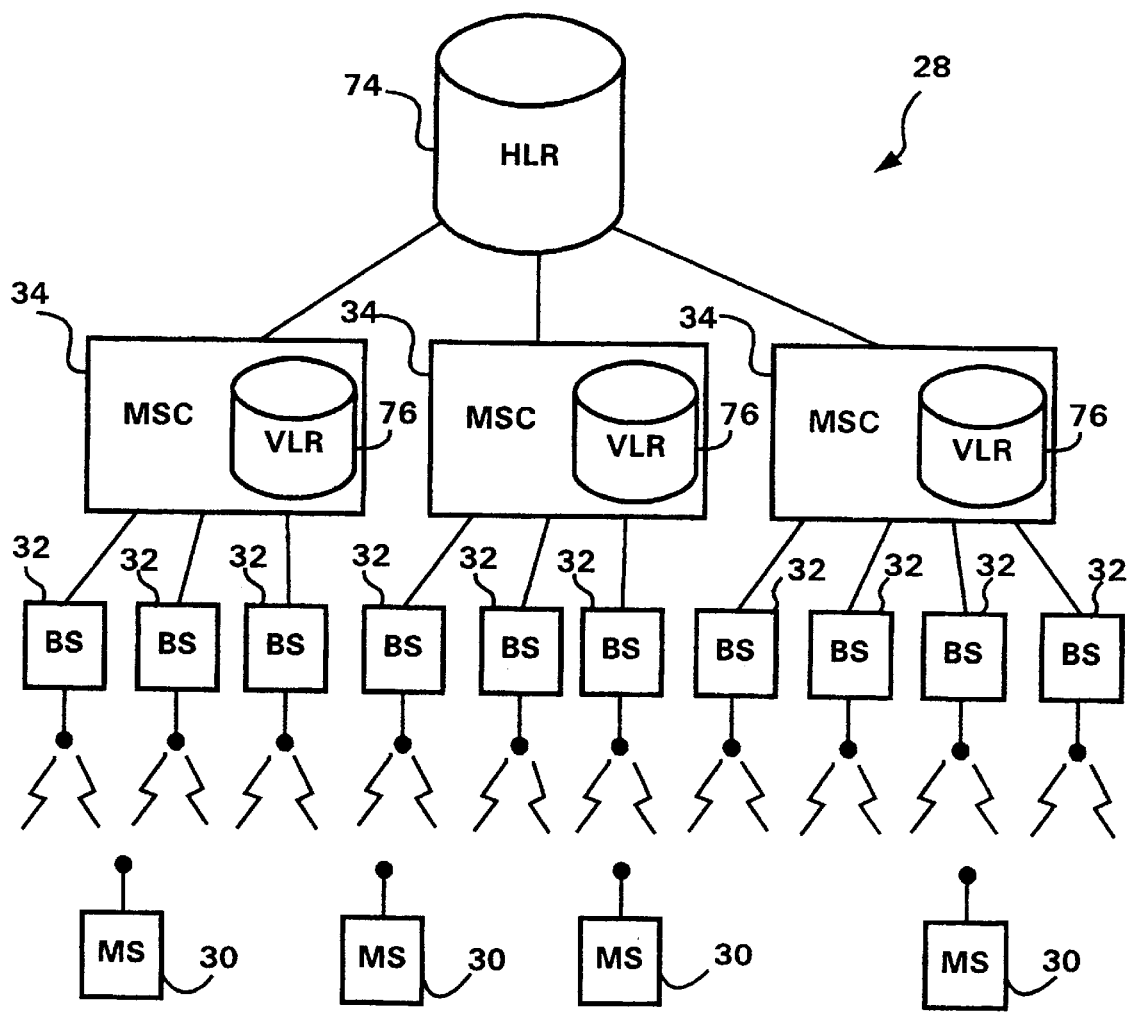
FIG. 3 is a block diagram illustrating the cellular communications system of the present invention.

Referring now to FIG. 3, cellular telephone service is provided within the cellular service area 10 by means of a cellular telephone system 28 comprising mobile stations (MS) 30, base stations (BS) 32, and at least one mobile switching center (MSC) 34. The mobile stations or terminals 30 are carried by each subscriber, and communicate with the base stations 32 in a manner well known to those skilled in the art by means of radio frequency communications links. Each base station 32 is located within a cell 20 (FIG. 2), and is connected to its associated mobile switching center 34 preferably through wire-lines or radio frequency links. The mobile switching centers 34 are connected to the public switched telephone network (PSTN) or other known communications network, and function to process and switch through the base stations 32 the cellular calls originated or received by the subscribers using the mobile stations 30. It will, of course, be understood that multiple mobile switching centers 34 may be needed to connect with the base stations 32 covering the area 10, and that the cells 20 in a service zone Z8 to Z11 for one subscriber zone profile may be served by different mobile switching centers 34. Furthermore, as discussed above, multiple service providers may be involved in offering the service to subscribers. To facilitate implementation of the predefined services, however, it is preferred that the cells 20 in any given service zone Z8 to Z11 be served by a single mobile switching center 34 and controlled by a single service provider.

Each of the cells 20 includes at least one base station 32 configured to facilitate communications with proximately located mobile stations 30. Although not shown in the drawings, the base stations 32 are typically positioned at or near the center of each of the cells. However, depending on geography and other known factors, the base stations 32 may instead be located at or near the periphery of, or otherwise away from the centers of, each of the cells. In such instances, the base stations 32 may broadcast and communicate with mobile stations 30 carried by subscribers who are located within the cells using directional rather than omnidirectional antennas. Each one of the base stations 32 includes a transmitter, a receiver, and a base station controller connected to the antenna in a manner and with a configuration well known in the art.

The special predefined service implemented by the cellular system 28 advantageously provides participating subscribers with services based on subscriber location. Subscriber location with respect to the subscriber is zone profile in that zone location is determined by which base station 32 (i.e., cell 20) is handling subscriber mobile station 30 communications at the time the call is either originated, received or handed-off.

The subscriber zone profiles are defined in HLR 74 with respect to cells grouped into zones. The zone profiles are stored in the HLR 74 and are translated into private system identification numbers (PSIDs) at the MSC 34. The subscriber zone identification information is down-loaded into the terminal as a PSID list using the Registration Accept message as defined in IS-136. The range of PSID values used will allow all PSIDs to be unique for a given SID. The applicable service zones (PSID list) that a cell belongs to is broadcasted on a cell basis. This allows an MS 30 to know when it is in a subscriber zone on a continuous basis. The greeting service provides the ability to associate and display a text string on a per zone (PSID) basis. There is an greeting default string (stored in the HLR) that is displayed in the MS 30 is in a location that does not belong to any zone.

This approach is based on the MS or terminal 30 storing the greetings. When the terminal is in a cell, the associated PSID list for that cell is broadcast. On acquiring this information, the terminal will compare the broadcast PSID list for that cell with the stored list associated with that terminal. Should there be a match, then the proper greeting is displayed, otherwise a default greeting is displayed.

Figure 4:
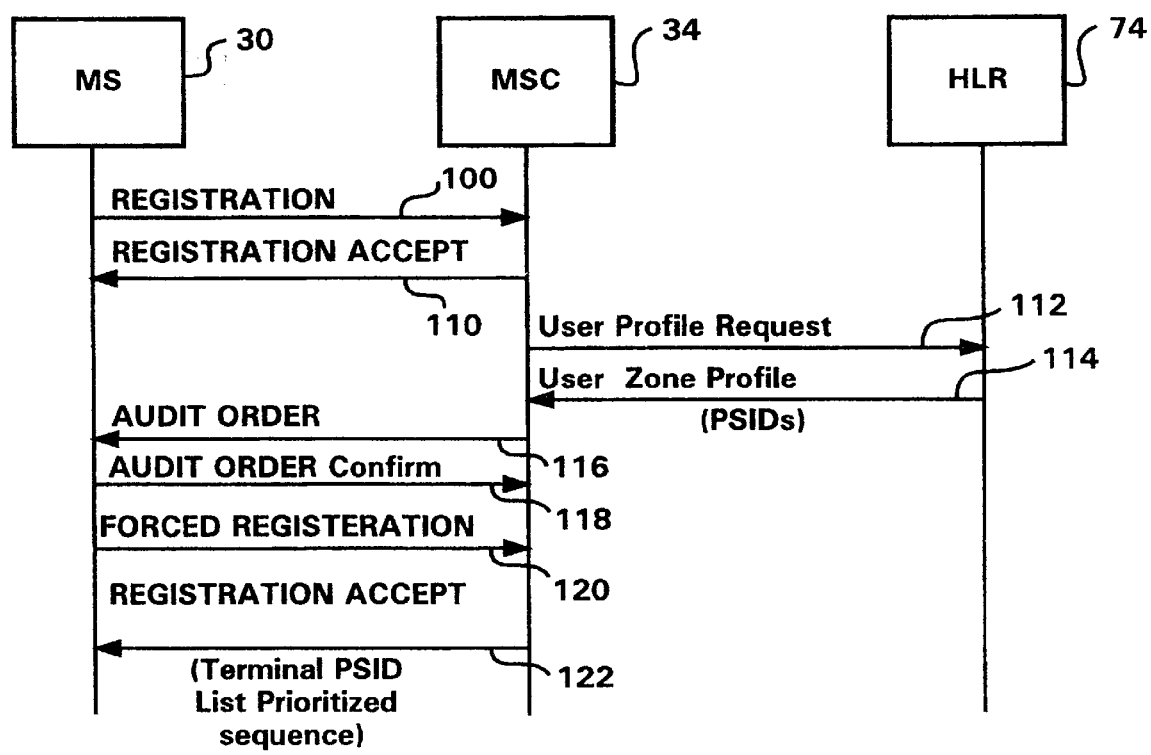
FIG. 4 are flow diagrams illustrating the message transfer within the cellular system of the present invention.

Referring to FIG. 4, there is shown a message diagram of how the zone information listing is downloaded in a prioritized sequence to the MS 30. When the MS 30 is powered on, it sends a registration request at line 100 to the MSC 34 via a local BS. The MSC then returns a registration accept message at 110 via an BS. Then the MSC sends a user profile request at 112 to the HLR 74. The HLR 74 then checks its records and determines a listing of the user's zone profiles and forwards this information in the form of zone information back at line 114 to the MSC. The MSC then provides an audit order at 116 to the MS 30 and the MS 30 confirms the audit order at line 118. This results in a forced registration from the MS 30 at line 120 to the MSC 34. The MSC 34 then sends back a registration accept message at 122 which includes the PSID listings as translated through the MSC from the HLR's zone information listing to the MSC's PSID's listing. The list identifies cells per zone and each zone is transmitted in order of priority. That is, if there is a overlap in service zones for which the terminal 30 is to provide a greeting, the terminal will provide the greeting associated with the first PSID forwarded back to it during the registration accept 122 message.

Accordingly, when an MS is powered on it receives during the registration process a PSID listing in which it receives services. At the same time, the BS for the cell 20 through which the MS is connected to the MSC broadcasts a cell identification with its own list of PSID identifications. In certain instances, this cell identification or PSID listing may correspond to more than one PSID listing and the MS has to determine which zone or PSID identification takes priority. The MS or terminal compares the cell broadcast PSID listing with the PSID list transmitted at registration. Normally, when there is a match in listings the terminal displays a message associated with the zone. In the event cell broadcast PSID list defines the cell to be in more than one of the zones broadcast to the terminal at registration, the terminal displays a message corresponding to the first zone PSID list transmitted to the terminal.

Figure 5:
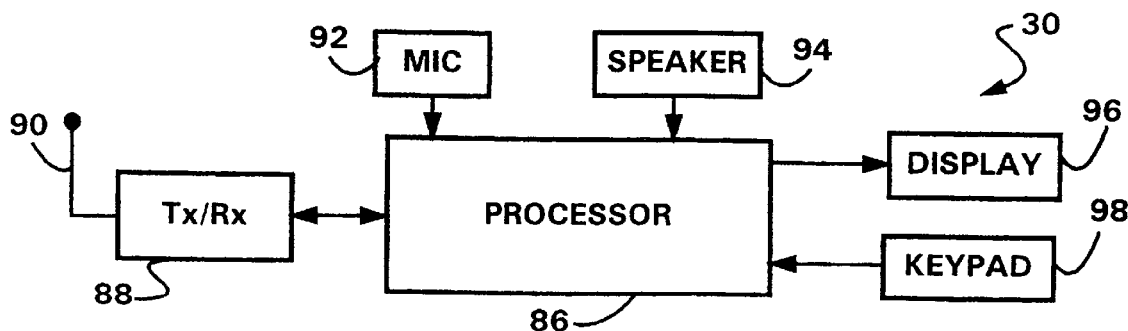
FIG. 5 is a simplified block diagram of a mobile station operable in the system of the present invention.

Referring now to FIG. 5, there is shown a simplified block diagram of the mobile station 30 including a processor 86 connected to a transceiver 88. An antenna 90 is connected to the transceiver 88 for transmitting and receiving communications over a cellular telephone network. The mobile station 30 further includes a microphone 92 and a 20 speaker 94 connected to the processor 86 for facilitating telephonic voice communications. A display panel 96 and a keypad 98 are also included in the mobile station and connected to the processor 86.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A cellular communication system for providing prioritized greetings of predefined services to a subscriber located in an area of overlapping service zones, each of said service zones defining, in a subscriber zone profile, a set of services available to the subscriber, the system including:

means for creating zone information which comprises the subscriber zone profiles from each of the overlapping service zones;

transmitting means for transmitting the zone information to the subscribers mobile station:

prioritizing means for assigning a priority to each of the subscriber zone profiles in the zone information; and greeting means responsive to the pritorizing means for providing a greeting to said subscriber identifying the predefined services available to the subscriber, said greeting means providing the greeting related to a higher prioritized subscriber zone profile when more than one subscriber zone profile is applicable.

2. The cellular communications system of claim 1 wherein said greeting means provides the zone information to the subscriber in sequential order of priority.

3. A cellular communications system for providing prioritized greetings of predefined services to its subscribers depending in which one of a plural of service zone the subscriber is located, the system including:

notifying means for notifying each of said subscribers of its subscriber zone profile information with an associated priority for which the subscriber receives differing redefined services, said notifying means transmitting subscriber zone information in sequential order of priority from highest priority associated with the first subscriber zone information transmitted to lowest priority associated with the last subscriber zone information transmitted;

comparing means for comparing subscriber zone profile information with the one service zone to determine applicability of predefined services to said subscriber; and greeting means responsive to said comparing means for providing a greeting to said subscriber identifying the predefined service available to the subscriber, said greeting means providing the greeting related to higher prioritized zone profile information when said comparing means determines more than one predefined services is applicable.

4. A cellular communications system for providing prioritized greetings of predefined services to its subscribers depending in which one of a plurality of service zones the subscriber is located, the system including:

notifying means for notifying each of said subscribers of its subscriber zone profile information with an associated priority for which the subscriber receives differing predefined services, said notifying means transmitting subscriber zone information in sequential order of priority from lowest priority associated with the first subscriber zone information transmitted to highest priority associated with the last subscriber zone information transmitted;

comparing means for comparing subscriber zone information with the one service zone to determine applicability of predefined services to said subscriber; and greeting means responsive to said comparing means for providing a greeting to said subscriber identifying the predefined service available to the subscriber, said greeting means providing the greeting related to higher prioritized zone profile information when said comparing means determines more than one predefined services is applicable.

5. The cellular communications system of claim 1 further including a plurality of cells wherein each of said zones includes at least one of the cells.

6. The cellular communications system of claim 1 wherein the subscriber zone information is transmitted to the subscriber.

7. A cellular communication system for providing prioritized greetings of predefined services to its subscribers, said system including:

means for identifying a plurality of service zones in the system;

means for transmitting predefined services to subscribers when located in said service zones;

means for transmitting service zone identification information from each service zone to each of said subscribers located in said service zone;

means for transmitting to each of said subscribers its subscriber zone profile information having an associated priority for which the subscriber receives differing predefined services;

comparing means for comparing subscriber zone profile information with the service zone information transmitted to determine applicability of predefined services to said subscriber; and, greeting means responsive to said comparing means for providing a greeting to said subscriber identifying the predefined service available to the subscriber when the transmitted zone profile information matches transmitted service zone identification information, said greeting means providing the greeting related to higher prioritized zone profile information when said comparing means determines more than one predefined services is applicable.

8. The cellular communications system of claim 7 wherein the means for transmitting service zone identification information transmits a plurality of zone id's.

9. The cellular communications system of claim 7 wherein said subscriber zone information is transmitted in a sequential order of priority.

10. The cellular communications system of claim 9 wherein the priority of the sequential order is highest priority associated with the first subscriber zone information transmitted to lowest priority associated with the last subscriber zone information transmitted.

11. The cellular communications system of claim 9 wherein the priority of the sequential order is lowest priority associated with the first subscriber zone information transmitted to highest priority associated with the last subscriber zone information transmitted.

12. The cellular communications system of claim 7 further including a plurality of cells and said means for identifying a plurality of service zones in the system further defining each of said zones to comprise at least one of the cells.

13. The cellular communications system of claim 7 wherein said means for identifying a plurality of service zones in the system comprises a mobile switching center (MSC).

14. The cellular communications system of claim 13 wherein the means for transmitting service zone identification information from each service zone to each of said subscribers located in said service zone transmits the service zone identification information on a cell by cell basis.

15. The cellular communications system of claim 14 wherein the means for transmitting service zone identification information comprises a base station electronically connected to said MSC, said base stations transmitting over a corresponding one of said cells the service zone identification information associated with that cell.

16. The cellular communications system of claim 7 wherein the cell or cells included within each of said service zones are selected by a provider of the cellular communications system.

17. The cellular communications system of claim 7 wherein the subscriber zone information is transmitted to the subscriber.

18. The cellular communications system of claim 13 further including a home location register (HLR) and wherein the subscriber zone information is stored in the HLR.

19. The cellular communications system of claim 18 wherein upon registration of the subscriber with the MSC the subscriber zone information is transmitted from the HLR through the MSC to the subscriber.

20. In a cellular communication system, a method for prioritizing greetings of predefined services to a subscriber located in an area of overlapping service zones, each of said service zones defining in a subscriber zone profile a set of services available to the subscriber, the method comprising the steps of:

creating zone information which comprises the subscriber zone profiles from each of the overlapping service zones;

transmitting the zone information to the subscriber's mobile station;

assigning a priority to each of the subscriber zone profiles in the zone information; and providing a greeting to said subscriber identifying the predefined service available to the subscriber where the greeting is related to higher prioritized zone profile when more than one subscriber zone profile is applicable.

21. The method of claim 20 wherein the step of providing a greeting includes providing the zone information to the subscriber in sequential order of priority.

22. A method for prioritizing greetings of predefined services to its subscribers depending in which one of a plurality of service zones the subscriber is located in a cellular communications system, the method comprising the steps of:

notifying each of said subscribers of its subscriber zone profile information with an associated priority for which the subscriber receives differing predefined services, said notifying step including transmitting subscriber zone information in sequential order of priority from highest priority associated with the first subscriber zone information transmitted to lowest priority associated with the last subscriber zone information transmitted;

comparing subscriber zone profile information with the service zone to determine applicability of predefined services to said subscriber; and providing a greeting to said subscriber identifying the predefined service available to the subscriber where the greeting is related to higher prioritized zone profile information when the comparing step determines that more than one predefined services is applicable.

23. A method for prioritizing greetings of predefined services to its subscribers depending in which one of a plurality of service zones the subscriber is located in a cellular communications system, the method comprising the steps of:

notifying each of said subscribers of its subscriber zone profile information with an associated priority for which the subscriber receives differing predefined services, said notifying step including transmitting subscriber zone information in sequential order of priority from lowest priority associated with the first subscriber zone information transmitted to highest priority associated with the last subscriber zone information transmitted, comparing subscriber zone profile information with the service zone to determine applicability of predefined services to said subscriber; and providing a greeting to said subscriber identifying the predefined service available to the subscriber where the greeting is related to higher prioritized zone profile information when the comparing step determines that more than one redefined services is applicable.

24. A method for prioritizing greetings of predefined services to subscribers in a cellular communications system, comprising the steps of:

identifying a plurality of service zones in the system;

transmitting predefined services to subscribers when located in the service zones;

transmitting service zone identification information from each service zone to each of the subscribers located in the service zone;

transmitting to each of the subscribers zone profile information having an associated priority for which the subscriber receives differing predefined services;

comparing subscriber zone profile information with the service zone information transmitted; and, providing a greeting to said subscriber identifying the predefined service available to the subscriber where the greeting is related to higher prioritized zone profile information when the comparing step determines that more than one predefined services is applicable.

25. The method of claim 24 wherein the step of transmitting to each of the subscribers zone profile information having an associated priority includes transmitting in sequential order of priority the subscriber zone profile information.

26. The method of claim 25 wherein the priority of the sequential order is highest priority associated with the first subscriber zone information transmitted and lowest priority associated with the last subscriber zone information transmitted.

27. The method of claim 25 wherein the priority of the sequential order is lowest priority associated with the first subscriber zone information transmitted to highest priority associated with the last subscriber zone information transmitted.

* * * * *